United States Patent
Busch et al.

(10) Patent No.: US 10,033,070 B2
(45) Date of Patent: *Jul. 24, 2018

(54) HIGHLY POROUS SEPARATOR FILM HAVING PARTIAL COATING

(71) Applicant: Treofan Germany GmbH & Co. KG, Neunkirchen (DE)

(72) Inventors: Detlef Busch, Saarlouis (DE); Bertram Schmitz, Sarreguemines (FR); Dominic Klein, Bexbach (DE)

(73) Assignee: Treofan Germany GmbH & Co. KG, Nuenkirchen (DE)

( * ) Notice: Subject to any disclaimer, the term of this patent is extended or adjusted under 35 U.S.C. 154(b) by 12 days.

This patent is subject to a terminal disclaimer.

(21) Appl. No.: 14/381,257

(22) PCT Filed: Feb. 27, 2013

(86) PCT No.: PCT/EP2013/000574
§ 371 (c)(1),
(2) Date: Aug. 27, 2014

(87) PCT Pub. No.: WO2013/131624
PCT Pub. Date: Sep. 12, 2013

(65) Prior Publication Data
US 2015/0093627 A1    Apr. 2, 2015

(30) Foreign Application Priority Data

Mar. 5, 2012  (DE) .................. 10 2012 004 161

(51) Int. Cl.
| | | |
|---|---|---|
| *H01M 10/42* | (2006.01) |
| *H01M 2/14* | (2006.01) |
| *H01M 2/16* | (2006.01) |
| *H01M 10/0525* | (2010.01) |

(52) U.S. Cl.
CPC ....... *H01M 10/4235* (2013.01); *H01M 2/145* (2013.01); *H01M 2/166* (2013.01); *H01M 2/1646* (2013.01); *H01M 2/1653* (2013.01); *H01M 2/1686* (2013.01); *H01M 10/0525* (2013.01)

(58) Field of Classification Search
CPC ............ H01M 10/4235; H01M 2/145; H01M 2/1646; H01M 2/1653; H01M 2/166; H01M 2/1686; H01M 10/0525
See application file for complete search history.

(56) References Cited

U.S. PATENT DOCUMENTS

| | | |
|---|---|---|
| 4,794,136 A | 12/1988 | Touhsaent |
| 2007/0020525 A1 | 1/2007 | Kim et al. |
| 2008/0024838 A1 | 10/2008 | Hennige et al. |
| 2008/0274410 A1 * | 11/2008 | Baba ............... H01M 2/164 429/251 |
| 2010/0159334 A1 * | 6/2010 | Kashima ........... H01M 2/162 429/231.95 |
| 2010/0203396 A1 | 8/2010 | Murata |
| 2010/0285348 A1 | 11/2010 | Murata et al. |
| 2010/0323233 A1 | 12/2010 | Hennige et al. |
| 2011/0171523 A1 | 7/2011 | Samii et al. |
| 2012/0202905 A1 | 8/2012 | Busch et al. |
| 2013/0021719 A1 | 1/2013 | Busch et al. |
| 2013/0040184 A1 | 2/2013 | Busch et al. |

FOREIGN PATENT DOCUMENTS

| | | | |
|---|---|---|---|
| DE | 3610644 A1 | 10/1986 | |
| DE | 4420989 A1 | 12/1995 | |
| DE | 19838800 C1 | 3/2000 | |
| DE | 10208277 A1 | 9/2003 | |
| DE | 102010018374 A1 | 10/2011 | |
| EP | 0557721 A2 | 9/1993 | |
| EP | 1173330 A2 | 1/2002 | |
| JP | 2005196999 A * | 7/2005 | |
| WO | WO-2005038946 A2 | 4/2005 | |
| WO | WO-2008038971 A1 | 4/2008 | |
| WO | WO-2010048395 A2 | 4/2010 | |
| WO | WO-2011047797 A1 | 4/2011 | |
| WO | WO-2011076375 A2 | 6/2011 | |
| WO | WO 2011134626 A1 * | 11/2011 | ........... B29C 55/005 |

OTHER PUBLICATIONS

International Search Report for PCT/EP2013/000574 dated Jun. 11, 2013.
International Preliminart Report on Patentability from corresponding International Application No. PCT/EP2013/000574 dated Sep. 9, 2014.

* cited by examiner

*Primary Examiner* — Gregg Cantelmo
(74) *Attorney, Agent, or Firm* — Drinker Biddle & Reath LLP

(57) ABSTRACT

The invention relates to a biaxially oriented, single or multilayer porous film comprising at least one porous layer, said layer containing at least one propylene polymer, wherein (i) the porosity of the porous film is 30% to 80%, and (ii) the permeability of the porous film is <1000 s (Gurley value). The invention is characterized in that (iii) the porous film is provided with a partially inorganic, preferably ceramic lamination, and (iv) in that the laminated porous film has a Gurley value of <1200 s. The invention further relates to a method for producing such a film, and to the use thereof in high-energy or high-performance systems, in particular in lithium batteries, lithium ion batteries, lithium polymer batteries, and alkaline earth batteries.

33 Claims, 2 Drawing Sheets

HIGHLY POROUS SEPARATOR FILM HAVING PARTIAL COATING

CROSS-REFERENCE TO RELATED APPLICATIONS

This application is a national stage application (under 35 U.S.C. § 371) of PCT/EP2013/000574, filed Feb. 27, 2013, which claims benefit of Gelman Application No. 102012004161.6, filed Mar. 5, 2012, both of which are incorporated herein by reference in their entirety.

BACKGROUND OF THE INVENTION

(1) Field of Invention

The present invention relates to a coated, porous film and use thereof as a separator, and to a method for producing the film.

(2) Description of Related Art

Modern appliances require an energy source, such as batteries or accumulators, which enable spatially independent use. Batteries have the disadvantage that they have to be disposed of. Accumulators (secondary batteries) are therefore used increasingly, which can be recharged forever with the aid of charging devices at the supply mains. Conventional nickel-cadmium accumulators (NiCd accumulators) for example may reach a service life of approximately 1,000 charging cycles with appropriate use. In high-energy or high-power systems, lithium, lithium-ion, lithium-polymer and alkaline earth batteries are nowadays increasingly used as accumulators.

Batteries and accumulators always consist of two electrodes, which dip into an electrolyte solution, and a separator, which separates the anode and cathode. The various accumulator types differ by the electrode material used, the electrolyte and the used separator. A battery separator has the task of spatially separating the cathode and anode in batteries, or negative and positive electrode in accumulators. The separator must be a barrier which electrically insulates the two electrodes from one another in order to avoid internal short circuits. At the same time however, the separator must be permeable for ions so that the electrochemical reactions in the cell can take place.

A battery separator must be thin so that the internal resistance is as low as possible and a high packing density can be attained. Only in this way are good performance data and high capacitances possible. In addition, it is necessary for the separators to absorb the electrolyte and to ensure the gas exchange when the cells are full. Whereas, previously, woven fabrics were used inter alia, fine pored materials, such as non-wovens and membranes, are nowadays predominantly used.

In lithium batteries, the occurrence of short circuits is a problem. Under thermal load, the battery separator in the lithium-ion batteries may melt and therefore lead to a short circuit with devastating consequences. Similar risks are posed when the lithium batteries are mechanically damaged or are overcharged by defective electronics of the charging devices.

In order to increase the safety of lithium-ion batteries, shut down separators were developed in the past (shut down membranes). These special separators close their pores within a very short period of time at a certain temperature, which is significantly below the melting point or the ignition point of lithium. The catastrophic consequences of a short circuit in the lithium batteries are therefore largely prevented.

At the same time however, a high mechanical strength is also desired for the separators and is ensured by materials having high melting points. For example, polypropylene membranes are thus advantageous due to the good resistance to perforation, however the melting point of polypropylene, at approximately 164° C., is very close to the flash point of lithium (170° C.).

High-energy batteries based on lithium technology are used in applications in which it is crucial to have available a maximum quantity of electrical energy in the smallest space. This is the case for example with traction batteries for use in electric vehicles, but also in other mobile applications in which maximum energy density at low weight is required, for example in the aerospace field. Currently, energy densities from 350 to 400 Wh/L or 150 to 200 Wh/kg are attained in high-energy batteries. These high-energy densities are achieved by the use of special electrode material (for example Li—CoO2) and the sparing use of housing materials. Thus, in Li batteries of the pouch cell type, the individual battery units are only still separated from one another by a film.

Due to this fact, higher demands are also placed on the separator in these cells, since, in the case of an internal short circuit and overheating, the explosion-like combustion reactions spread to the adjacent cells.

Separator materials for these applications must have the following properties: they must be as thin as possible in order to ensure a load specific spatial requirement and in order to keep small the internal resistance. In order to ensure these low internal resistances, it is important that the separator also has a high porosity. Further, they must be light, so that a low specific weight is achieved, and they must be absolutely safe. This means that, in the case of an overheating or mechanical damage, positive and negative electrodes must by all means remain separated in order to prevent further chemical reactions that cause the batteries to catch fire or explode.

It is known in the prior art to combine polypropylene membranes with further layers that are formed from materials having a lower melting point, for example from polyethylene. In the case of an overheating caused by short circuit or other external influences, the polyethylene melts and closes the pores of the porous polypropylene layer, whereby the ion flow and therefore current flow in the battery is interrupted. However, with a further temperature rise (>160° C.), the polypropylene layer also melts and an internal short circuit caused by contact between the anode and cathode and the resultant problems, such as spontaneous combustion and explosion, can no longer be prevented. In addition, the adhesion of the polyethylene layers on polypropylene is problematic, such that these layers can only be combined by coating or only selected polymers of these two classes can be coextruded. In high-energy applications, these separators offer only insufficient safety. A film of this type is described in WO 2010048395.

US2011171523 describes a heat-resistant separator that is obtained via a solvent method. Here, inorganic particles (chalk, silicates or alumina) are compounded in a first step into the raw material (UHMW-PE) together with an oil. This mixture is then extruded through a die to form a preliminary film, the oil is then dissolved out from the preliminary film by means of a solvent in order to create the pores, and this film is then subsequently drawn in order to form the separator. In this separator, the inorganic particles then ensure the separation between anode and cathode in the battery, even in the case of severe overheating.

However, this method has the disadvantage that the particles contribute to the weakening of the mechanical properties of the separator, and, on the other hand, defects and uneven pore structure can be produced by agglomerates of the particles.

US2007020525 describes a ceramic separator that is obtained by processing inorganic particles with a polymer-based binder. This separator too ensures that the anode and cathode in the battery remain separated in the case of severe overheating. However, the production method is complex and the mechanical properties of the separator are inadequate.

DE19838800 proposes an electrical separator with a composite structure that comprises a flat, flexible substrate with a plurality of openings and with a coating located thereon. The material of the substrate is selected from metals, alloys, plastics, glass and carbon fibre or a combination of such materials, and the coating is a flat continuous, porous, electrically non-conductive ceramic coating. The use of the ceramic coating provides thermal and chemical resistance. However, these separators are very thick due to the substrate material and have proven to be problematic in terms of production, since a faultless large-area coating can only be produced with considerable technical outlay.

In DE10208277 the weight and the thickness of the separator were reduced by using a non-woven polymer fabric, however the embodiments described there of a separator also fail to satisfy all the demands placed on a separator for a lithium high-energy battery, in particular because, in accordance with the teaching of this application, particular value was placed on pores of the separator that are as large as possible. With the particles described there, which are up to 5 μm in size, it is not possible, however, to produce separators 10 to 40 μm thick, since only a few particles would come to be arranged above one another here. The separator would thus inevitably have a high defect and imperfection density (for example holes, tears, etc.).

WO 2005038946 describes a heat-resistant separator formed from a substrate made of woven or non-woven polymer fibres with a porous inorganic ceramic layer on and in this substrate, which ceramic layer is connected by an adhesive to the substrate. Here too, the guarantee of a faultless coating and also the resultant thickness and weight are to be considered as problematic.

The coating of stretched polypropylene films with inorganic materials was previously only seldom implemented, since it is known that already the adhesion of organic coating layers is only insufficient and therefore adhesion promoters have to be added. This problem is described for example in U.S. Pat. No. 4,794,136. Here, the use of a melamine/acrylate primer as adhesion promoter between polyolefin films and PVDC coatings is described. However, adhesion promoters tend to close the pores and thus unnecessarily enhance the resistance. The flaking of the coating during battery manufacture constitutes an additional safety risk. Furthermore, the adhesion promoters are insoluble in the organic electrolyte used in Li batteries, inter alia so as not to negatively influence the conductivity of the electrolyte.

EP1173330 concerns the use of a boPP film as substrate film in the production of ceramic capacitors. The multilayer film is formed from a base layer and at least one cover layer (A), wherein the cover layer (A) contains a propylene polymer and at least one incompatible polyolefin, and wherein the incompatible polyolefin is an LDPE, HDPE, MDPE, ethylene propylene copolymer or a cycloolefin polymer or a syndiotactic polymer. The film is provided on a surface with a ceramic coating, and this coating is dried and then separated from the substrate film. In this invention, use is made of a low adhesion of the ceramic coating on the boPP film. Within the scope of the present invention, it has surprisingly been found that polypropylene separators can be partially coated with a certain surface structure without the use of primers, wherein the particles, with use of a small quantity of binder or even without binder, have an adhesion in the surface structure and demonstrate an adhesion that is sufficient for the further processing. The adhesion with respect to a large number of coatings is also provided here without the use of a primer.

Polyolefin separators can nowadays be produced by different methods: filler methods; cold drawing, extraction methods and β-crystallite methods. These methods differ in principle by the different mechanisms by means of which the pores are produced.

By way of example, porous films can be produced by the addition of very high filler quantities. The pores are produced with drawing by the incompatibility of the fillers with the polymer matrix. However, the large filler quantities of up to 40% by weight, which are necessary in order to attain high porosities, significantly impair the mechanical strength in spite of high drawing, and therefore these products cannot be used as separators in a high-energy cell.

In what are known as extraction methods, the pores are produced in principle by dissolving out a component form the polymer matrix by means of suitable solvent. Here, a wide range of variants have been developed, which differ by the type of additives and the suitable solvents. Both organic and inorganic additives can be extracted. This extraction can be implemented as the last method step with the production of the film or can be combined with a subsequent drawing. In this case, the ecologically and economically questionable extraction step is disadvantageous.

An older, but successful method is based on a drawing of the polymer matrix at very low temperatures (cold drawing). To this end, the film is first extruded and then annealed for a few hours in order to increase the crystalline component. In the next method step, cold drawing is performed in the longitudinal direction at very low temperatures in order to produce a multiplicity of defects in the form of very small microcracks. This pre-drawn film with defects is then again drawn in the same direction at increased temperatures with higher factors, wherein the defects are enlarged to form pores, which form a network-like structure. These films combine high porosities and good mechanical strength in the direction of their drawing, generally the longitudinal direction. The mechanical strength in the transverse direction however remains inadequate, whereby the resistance to perforation is poor and there is a high tendency for splitting in the longitudinal direction. On the whole, the method is cost-intensive.

A further known method for producing porous films is based on the admixing of β-nucleation agents to polypropylene. As a result of the β-nucleation agent, the polypropylene forms what are known as β-crystallites in high concentrations as the melt cools. With the subsequent longitudinal drawing, the β-phase converts into the alpha-modification of the polypropylene. Since these different crystal forms differ in terms of density, many microscopic defects are also initially produced here and are torn open by the drawing to form pores. The films produced by this method have good porosities and good mechanical strength in the longitudinal and transverse direction and a very good cost effectiveness. Compared with the monoaxially cold-drawn separators, they form a surface structure essential for the invention. These films will also be referred to hereinafter as β-porous films. To improve the porosity, a higher orientation can be introduced in the longitudinal direction prior to the transverse drawing.

BRIEF SUMMARY OF THE INVENTION

The object of the present invention was therefore to provide a porous flexible film which on the one hand has a high porosity and permeability and has excellent mechanical strength and on the other hand is coated with heat-resistant materials and which, in the case of an overheating, protects the anode and cathode against direct contact once the porous film has melted. This film should then ensure sufficient safety, even in high-energy batteries. Furthermore, the porous flexible film should additionally provide sufficient protection against internal short circuits in the case of the use as separator membrane.

It has surprisingly been found that inorganically, preferably ceramically coated separator films based on porous polyolefin films, which provide the required safety, can be produced when the ceramic coating is applied to a biaxially oriented single or multilayer porous film, of which the porosity is produced by converting β-crystalline polypropylene when drawing the film, wherein the porous film comprises at least one porous layer and this layer contains at least one propylene polymer and β-nucleation agent, and wherein the film, prior to the coating has a Gurley value of <1,000 s and the coating is applied in such small quantities that a continuous layer does not form on the surface of the film.

The present invention thus relates to a biaxially oriented single or multilayer porous film comprising at least one porous layer, said layer containing at least one propylene polymer, wherein
(i) the porosity of the porous film is 30% to 80%, and
(ii) the permeability of the porous film prior to the coating is <1,000 s (Gurley value),
characterised in that
(iii) the porous film has a partially inorganic, preferably ceramic coating, and
(iv) the coat porous film has a Gurley value of <1,200 s.

DETAILED DESCRIPTION OF THE INVENTION

Separator Film

Figure 1:
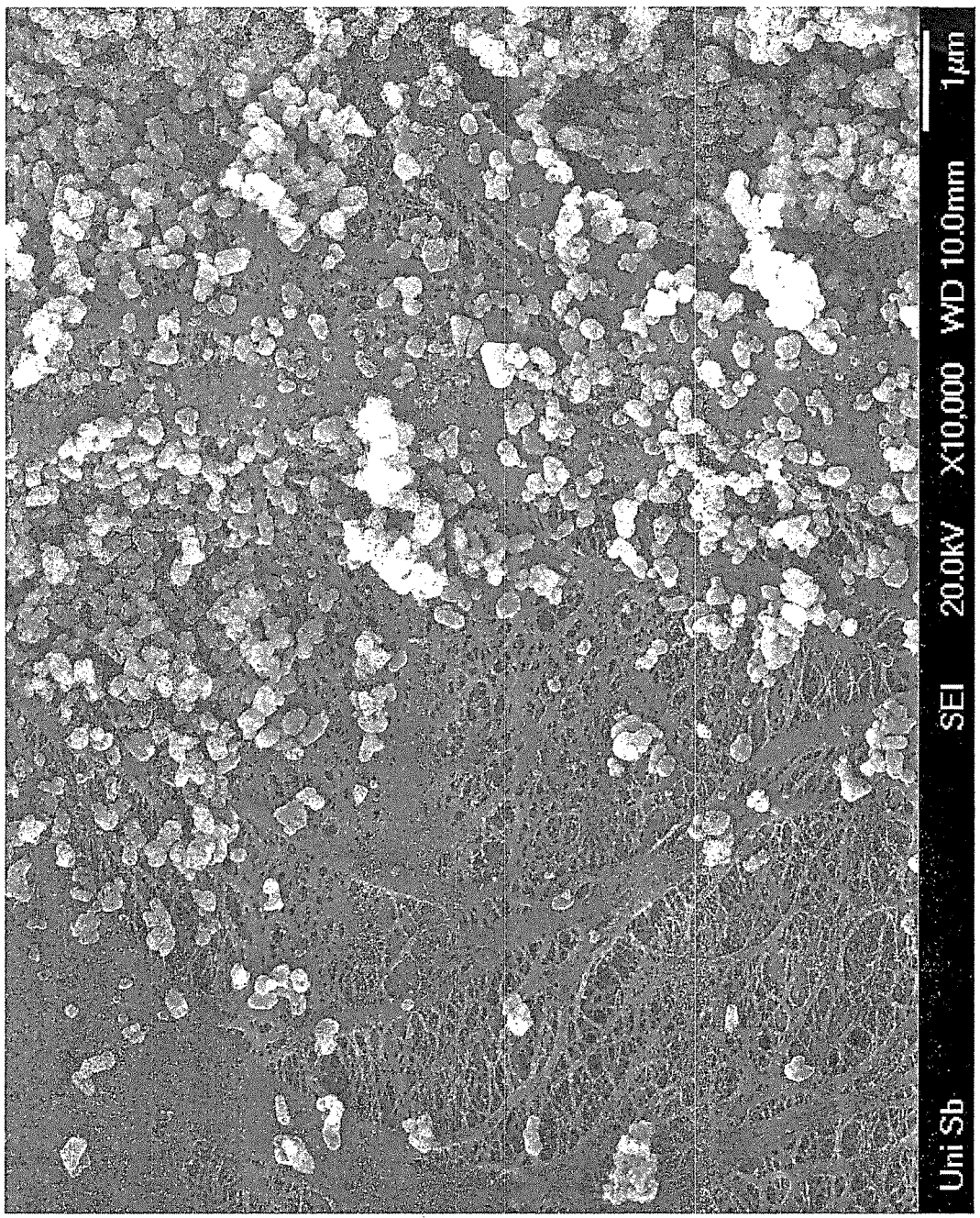
FIG. 1 is an illustration of the layer film according to the invention.

The inorganic, preferably ceramic, partially coated separator films according to the invention based on porous polyolefin films comprise a porous, biaxially oriented film made of polypropylene (BOPP) with very high porosity and high permeability of <1,000 s (Gurley value). The use of such BOPP films as separator films is already known. These films preferably contain β-nucleation agents. The porosity according to the invention of the film is produced by conversion of β-crystalline polypropylene when drawing the film, wherein at least one β-nucleation agent is present in the film.

Porous BOPP films of this type are also particularly suitable for use as a separator in double layer capacitors (DLCs).

The porous films used in accordance with the invention for coating, following a longitudinal drawing, have a moderate orientation in the longitudinal direction and are then oriented in the transverse direction, such that, as BOPP film, they have a high porosity and a very high permeability and the tendency for splitting in the longitudinal direction is reduced. Here, it is advantageous to perform this transverse drawing with a very slow drawing speed of preferably less than 40%/s.

The films used in accordance with the invention for the coating may be single or multilayer. The production of such single-layer or multilayer porous polypropylene film in which propylene polymer and β-nucleation agent are melted in an extruder and extruded through a flat film die onto a take-off roll is already described in detail in DE-A-102010018374. The melt film cools on the take-off roll, thus forming β-crystallites, and solidifies. This film is then drawn in the longitudinal direction and immediately thereafter in the transverse direction.

Instead of the immediate transverse drawing, the films used in accordance with the invention for coating can also be rolled up following the drawing in the longitudinal direction and unrolled at a later moment in time in a second transverse drawing process, heated to transverse drawing temperature and drawn in the transverse direction, wherein the process speed of the longitudinal drawing process is quicker or slower than the process speed of the transverse drawing process.

The porous BOPP films used in accordance with the invention for coating comprise at least one porous layer, which is formed from polypropylene polymers, preferably propylene homopolymers and/or propylene block copolymers, and contains β-nucleation agent. Where appropriate, other polyolefins can additionally be contained in low quantities, provided they do not adversely influence the porosity and other essential properties. Furthermore, the microporous layer additionally contains conventional additives where appropriate, for example stabilisers and/or neutralisation agents, in effective quantities in each case.

Suitable propylene homopolymers contain 98 to 100% by weight, preferably 99 to 100% by weight, of propylene units and have a melting point (DSC) of 150° C. or higher, preferably 155 to 170° C., and generally a melt flow index from 0.5 to 10 g/10 min, preferably 2 to 8 g/10 min, at 230° C. and a force of 2.16 kg (DIN 53735). Isotactic propylene homopolymers with an n-heptane soluble component of less than 15% by weight, preferably 1 to 10% by weight, constitute preferred propylene homopolymers for the layer. Isotactic propylene homopolymers with a high chain isotacticity of at least 96%, preferably 97-99% ($^{13}$C-NMR; triad method), can also advantageously be used. These raw materials are known as HIPP (high isotactic polypropylene) polymers or HCPP (high crystalline polypropylene) in the prior art and are characterised by a high stereoregularity of the polymer chains, higher crystallinity and a higher melting point (compared with propylene polymers with a $^{13}$C-NMR isotacticity from 90 to <96%, which can be used equally).

Propylene block copolymers have a melting point of more than 140 to 170° C., preferably from 145 to 165° C., in particular 150 to 160° C., and a melting range that starts at above 120° C., preferably in a range of 125-140° C. The copolymer content, preferably ethylene content, for example is between 1 and 20% by weight, preferably 1 and % by weight. The melt flow index of the propylene block copolymers generally lies in a range from 1 to 20 g/10 min, preferably 1 to 10 g/10 min.

Where appropriate, the porous layer may additionally contain other polyolefins, provided they do not negatively influence the properties, in particular the porosity and the mechanical strength. For example, other polyolefins are statistical copolymers of ethylene and propylene with an ethylene content of 20% by weight or below, statistical copolymers of propylene with $C_4$-$C_8$ olefins with an olefin content of 20% by weight or below, terpolymers of propylene, ethylene and butylene with an ethylene content of 10% by weight or below and with a butylene content of 15% by weight or below.

In a preferred embodiment, the porous layer is formed only from propylene homopolymer and/or propylene block copolymer and β-nucleation agent, and where appropriate stabiliser and neutralisation agent.

In a preferred embodiment, the porous BOPP films used in accordance with the invention for coating do not comprise any polyolefins that have been produced by means of what are known as metallocene catalysts.

In principle, all known additives that promote the formation of β-crystals of the polypropylene as a polypropylene melt cools are suitable as β-nucleation agents for the porous layer. Such β-nucleation agents, and also their efficacy in a polypropylene matrix, are known per se in the prior art and will be described in detail hereinafter.

Various crystalline phases of polypropylene are known. When a melt is cooled, the α-crystalline PP is usually formed predominantly, of which the melting point lies in the range of 155-170° C., preferably 158-162° C. By means of a specific temperature control, a low proportion of β-crystalline phase can be produced when cooling the melt, which phase has a much lower melting point compared with the monoclinic α-modification, with values of 145-152° C., preferably 148-150° C. In the prior art, additives are known that lead to an increased proportion of the β-modification when cooling the polypropylene, for example γ-quinacridone, dihydroquinacridine or calcium salts of phthalic acid.

For the purposes of the present invention, highly active β-nucleation agents are preferably used, which, when cooling a propylene homopolymer melt, produce a β-proportion of 40-95%, preferably of 50-85% (DSC). The β-proportion is determined from the DSC of the cooled propylene homopolymer melt. By a way of example, a two-component β-nucleation system formed of calcium carbonate and organic dicarboxylic acids is preferred and is described in DE 3610644, to which reference is hereby expressly made. Calcium salts of dicarboxylic acids, such as calcium pimelate or calcium suberate, are particularly advantageous, as described in DE 4420989, to which reference is also expressly made. The dicarboxamides described in EP-0557721, in particular N,N-dicyclohexyl-2,6-naphthalene dicarboxamides, are suitable β-nucleation agents. Furthermore, the use of the nanoscale nucleation agents described in WO2011047797A1, to which reference is hereby expressly made, for example such as nano-calcium pimelate and nano-calcium suberate, is preferred. In the context of the present invention, "nanoscale" means an average particle diameter in the range from 1 to 500 nm.

In addition to the β-nucleation agents, the observance of a certain temperature range and dwell times at these temperatures when cooling the undrawn melt film is key in order to attain a high proportion of β-crystalline polypropylene. The melt film is preferably cooled at a temperature from 60 to 140° C., in particular 80 to 130° C., for example 85 to 128° C. Slow cooling also promotes the growth of the β-crystallites, and therefore the discharge speed, that is to say the speed at which the melt film passes over the first chilling roll, should be slow so that the necessary dwell times at the selected temperatures are sufficiently long. The discharge speed is preferably less than 25 m/min, in particular 1 to 20 m/min. The dwell time is generally 20 to 300 s; preferably 30 to 200 s.

The porous layer generally contains 45 to <100% by weight, preferably 50 to 95% by weight, of propylene homopolymers and/or propylene block copolymer and 0.001 to 5% by weight, preferably 50-10,000 ppm, of at least one β-nucleation agent, in relation to the weight of the porous layer.

In a further embodiment of the invention, further polyolefins may be present in the porous layer. The proportion of the propylene homopolymers or of the block copolymers is thus reduced accordingly. For example, polyethylenes are used as further polyolefins. Generally, the quantity of additional polymers, in particular based on polyethylene, in the layer is 0 to <40% by weight, preferably 5 to 30% by weight, in particular 10 to 25% by weight. Similarly, said propylene homopolymer or propylene block copolymer proportion is reduced when higher quantities of up to 5% by weight of nucleation agent are used. In addition, the layer may contain conventional stabilisers and neutralisation agents, and where appropriate further additives, in the conventional low quantities of less than 2% by weight.

In a preferred embodiment, the porous layer is formed from a mixture of propylene homopolymer and propylene block copolymer. The porous layer in this embodiment generally contains 50 to 85% by weight, preferably 60 to 75% by weight, of propylene homopolymers and 15 to 50% by weight of propylene block copolymers, preferably 25 to 40% by weight, and 0.001 to 5% by weight, preferably 50 to 10,000 ppm, of at least one β-nucleation agent, in relation to the weight of the layer, and where appropriate the aforementioned additives, such as stabilisers and neutralisation agents. Here too, it is true that further polyolefins can be contained in a quantity of 0 to <10% by weight, preferably 0 to 5% by weight, in particular 0.5 to 2% by weight, and the proportion of the propylene homopolymers or of the block copolymers is then reduced accordingly.

Particularly preferred embodiments of the porous film according to the invention contain 50 to 10,000 ppm, preferably 50 to 5,000 ppm, in particular 50 to 2,000 ppm, of nanoscale calcium pimelate or calcium suberate as β-nucleation agent in the porous layer, wherein nanoscale calcium pimelates or calcium suberates are preferred.

The porous film may be single or multilayer. The thickness of the film generally lies in a range from 10 to 100 μm, preferably 15 to 60 μm, for example 15 to 40 μm. The porous film can be provided on its surface with a corona, flame or plasma treatment in order to improve the filling with electrolyte.

In a multilayer embodiment, the film comprises further porous layers, which are formed as described above, wherein the composition of the different porous layers does not necessarily have to be identical. For multilayer embodiments, the thickness of the individual layers is generally 2 to 50 μm.

The density of the porous film to be coated generally lies in a range from 0.1 to 0.6 g/cm$^3$, preferably 0.2 to 0.5 g/cm$^3$. The applied partial coating does not significantly change the density of the porous film, or only changes it to a small extent of approximately 1 to 5%.

The bubble point of the film to be coated should not be above 350 nm, preferably in the range from 20 to 350 nm, in particular from 40 to 30 nm, particularly preferably 50 to 300 nm, and the mean pore diameter should lie in the range of 50 to 100 nm, preferably in the range 60-80 nm.

The porosity of the porous film (BOPP film) to be coated generally lies in a range from 30% to 80%, preferably 50% to 70%.

The porous film (BOPP film) to be coated has a defined roughness Rz (DIN 4768, cut-off 2.5 mm) from 0.02 μm to 6 μm, preferably 0.3 to 6 μm, particularly preferably 0.5 to 5 μm, in particular 0.5 to 3.5 μm.

The porous film (BOPP film) to be coated preferably has a β-activity from 35% to 99%.

In a further embodiment, the porous BOPP film to be coated has a shut down function. The shut down function can be integrated in the porous film, such that the porous film, besides the above-mentioned materials, additionally contains the shut down materials specified hereinafter. Alternatively, the shut down function is present in the form of a specific shut down layer on the porous BOPP film to be coated. In this case, the porous BOPP film to be coated has at least two layers, wherein the shut down material, together with the polymers of the porous film, forms the shut down layer. If the shut down layer is present as a specific shut down layer, the thickness of this separate shut down layer is preferably 3 to 25 μm, in particular 5 to 15 μm. Where appropriate, the porous film may also comprise two shut down layers, which are formed from a mixture of the polymers of the porous film and of the shut down material.

Polyethylenes, such as HDPE or MDPE, are preferred as shut down materials. These are generally incompatible with the polypropylene and form a separate phase in mixture with polypropylene. The presence of a separate phase is evident, for example in a DSC measurement, by a separate melt peak in the region of the melting point of the polyethylene, generally in a range from 115-140° C.

The HDPE generally has an MFI (50 N/190° C.) of greater than 0.1 to 50 g/10 min, preferably 0.6 to 20 g/10 min, measured in accordance with DIN 53 735 and a viscosity number, measured in accordance with DIN 53 728, part 4, or ISO 1191, in the range from 100 to 450 cm$^3$/g, preferably 120 to 280 cm$^3$/g. The crystallinity is 35 to 80%, preferably 50 to 80%. The density, measured at 23° C. in accordance with DIN 53 479, method A, or ISO 1183, lies in the range from >0.94 to 0.97 g/cm$^3$. The melting point, measured with DSC (maximum of the melt curve, heating rate 20° C./min), is between 120 and 145° C., preferably 125-140° C.

Suitable MDPE generally has an MFI (50 N/190° C.) of greater than 0.1 to 50 g/10 min, preferably 0.6 to 20 g/10 min, measured in accordance with DIN 53 735. The density, measured at 23° C. in accordance with DIN 53 479, method A, or ISO 1183, lies in the range from >0.925 to 0.94 g/cm$^3$. The melting point, measured with DSC (maximum of the melt curve, heating rate 20° C./min), lies between 115 and 130° C., preferably 120-125° C.

It is additionally advantageous in accordance with the invention for the polyethylene to have a narrow melting range. This means that, in a DSC of the polyethylene, the start of the melting range and the end of the melting range are distanced from one another at most by 10 K, preferably 3 to 8 K. here, the start of the melting range is constituted by the extrapolated onset and the end of the melting range is accordingly constituted by the extrapolated end of the melting curve (heating rate 10 K/min).

The material forming the shut down function, in particular the polyethylene, is used in the porous BOPP film according to the invention, together with the polymers of the porous film, preferably in quantities of at least 5% by weight in relation to the provided propylene polymers and/or propylene block copolymers provided, particularly preferably in quantities of at least 10% by weight.

The porous film provided with a shut down function has the above-described preferred ranges in terms of porosity, permeability, β-nucleation, transverse drawing, polymer composition, production, density, bubble point, surface roughness and/or β-activity. These are also explicitly part of the invention and description thereof for this embodiment, without these being repeated explicitly at this juncture.

Inorganic, Preferably Ceramic Coating

The biaxially oriented single or multilayer porous film according to the invention, with or without shut down function, has, at least on one side of the surface, a partially inorganic, preferably ceramic coating. In this context, the term "partially" means that the inorganic, preferably ceramic coating is not provided over the entire surface of a side of the film. Usually, merely an area of up to 95% of the entire surface of a side of the film is provided with the inorganic, preferably ceramic coating, preferably 10 to 95%, particularly preferably 20 to 95%, in particular 25 to 90%, is provided with the inorganic, preferably ceramic coating. The partial coating enables on the one hand the sufficient protection against internal short circuits and on the other hand a sufficient permeability of the coated porous film of <1,200 s Gurley.

In a preferred embodiment, both sides of the film are provided with the partial inorganic, preferably ceramic coating.

The coating or the material of the partial coating is electrically insulating.

The inorganic, preferably ceramic coating according to the invention comprises ceramic particles, which is also understood to mean inorganic particles. The particle size expressed as D50 value lies in the range between 0.005 and 10 μm, preferably in the range 0.01 to 7 μm. The exact particle size is selected in accordance with the thickness of the inorganic, preferably ceramic coating. Here, it has been found that the D50 value should not be greater than 50% of the thickness of the inorganic, preferably ceramic coating, preferably should not be greater than 33% of the thickness of the inorganic, preferably ceramic coating, and in particular should not be greater than 25% of the thickness of the inorganic, preferably ceramic coating. In a particularly preferred embodiment of the invention, the D90 value is no greater than 50% of the thickness of the inorganic, preferably ceramic coating, preferably no greater than 33% of the thickness of the inorganic, preferably ceramic coating, and in particular no greater than 25% of the thickness of the inorganic, preferably ceramic coating.

In the context of the present invention, inorganic, preferably ceramic particles are understood to mean all natural or synthetic minerals, provided they have the aforementioned particle sizes. The inorganic, preferably ceramic particles are not subject to any limitation in terms of the particle geometry, however spherical particles are preferred. Furthermore, the inorganic, preferably ceramic particles may be present in crystalline form, partly crystalline form (minimum 30% crystallinity) or non-crystalline form.

In the context of the present invention, ceramic particles are understood to mean materials based on silicate raw materials, oxidic raw materials, in particular metal oxides, and/or non-oxidic and non-metallic raw materials.

Suitable silicate raw materials include materials that have an SiO4 tetrahedron, for example layer or framework silicates.

Suitable oxidic raw materials, in particular metal oxides, for example include aluminas, zirconium oxides, barium titanate, lead zirconate titanate, ferrites and zinc oxide.

Suitable non-oxidic and non-metallic raw materials for example include silicon carbide, silicon nitride, aluminium nitride, boron nitride, titanium boride and molybdenum silicide.

Further particles used in accordance with the invention consist of electrically insulating materials, preferably a non-electrically conducting oxide of the metals Al, Zr, Si, Sn, Ti and/or Y. The production of such particles is described in detail in DE-A-10208277, for example.

Among the inorganic, preferably ceramic particles, particles based on oxides of silicon with the empirical formula $SiO_2$, and also mixed oxides with the empirical formula $AlNaSiO_2$, and oxides of titanium with the empirical formula $TiO_2$ are particularly preferred, wherein these can be present in crystalline, amorphous or mixed form. The inorganic, preferably ceramic particles are preferably polycrystalline materials, in particular those of which the crystallinity is more than 30%.

The application quantity of the partial inorganic, preferably ceramic coating is preferably 0.1 $g/m^2$ to 20 $g/m^2$, in particular 0.5 $g/m^2$ to 10 $g/m^2$, in relation to the particles, or, in the case that a binder is used, particles plus binder after drying.

The application quantity of inorganic, preferably ceramic particles is preferably 0.08 $g/m^2$ to 18 $g/m^2$, in particular 0.4 $g/m^2$ to 8 $g/m^2$, in relation to particles after drying.

The inorganic, preferably ceramic coating according to the invention comprises inorganic, preferably ceramic particles that preferably have a density in the range from 1.5 to 8 $g/cm^3$, preferably 2 to 5 $g/cm^3$.

The inorganic, preferably ceramic coating according to the invention comprises inorganic, preferably ceramic particles that preferably have a hardness of at least 2 on the Mohs scale.

The inorganic, preferably ceramic coating according to the invention comprises inorganic, preferably ceramic particles that preferably have a melting point of at least 160° C., in particular at least 180° C., most preferably at least 200° C. In addition, the aforementioned particles also should not experience any decomposition at the specified temperatures. The aforementioned specifications can be determined by means of known methods, for example DSC (differential scanning calorimetry) or TG (thermogravimetry).

The inorganic, preferably ceramic coating according to the invention comprises inorganic, preferably ceramic particles that preferably have a compressive strength of at least 100 kPa, particularly preferably of at least 150 kPa, in particular of at least 250 kPa. Compressive strength means that at least 90% of the particles present have not been destroyed by the effective pressure.

Coatings that have a thickness from 0.5 μm to 10 μm and inorganic, preferably ceramic particles in the range between 0.02 and 5 μm (d50 value), preferably in the range 0.05 to 2 μm (d50 value), are preferred.

Coatings that (i) have a thickness from 0.5 μm to 10 μm and (ii) contain inorganic, preferably ceramic particles in the range between 0.02 and 5 μm (d50 value), preferably in the range 0.05 to 2 μm (d50 value), of which the compressive strength is at least 100 kPa, particularly preferably at least 150 kPa, in particular at least 250 kPa, are particularly preferred.

Coatings that (i) have a thickness from 0.05 μm to 10 μm and (ii) contain inorganic, preferably ceramic particles in the range between 0.02 and 5 μm (d50 value), preferably in the range 0.05 to 2 μm (d50 value), of which the compressive strength is at least 100 kPa, particularly preferably at least 150 kPa, in particular at least 250 kPa, and the d50 value is no greater than 50% of the thickness of the inorganic, preferably ceramic coating, preferably no greater than 33% of the thickness of the inorganic, preferably ceramic coating, in particular no greater than 25% of the thickness of the inorganic, preferably ceramic coating, are particularly preferred.

The inorganic, preferably ceramic coating according to the invention, besides the aforementioned inorganic, preferably ceramic particles, may also contain at least one end-consolidated binder selected from the group of binders based on polyvinylene dichloride (PVDC), polyacrylates, polymethacrylates, polyethylene imines, polyesters, polyamides, polyimides, polyurethanes, polycarbonates, silicate binders, grafted polyolefins, polymers from the class of halogenated polymers, for example PTFE, and mixtures thereof.

The binders used in accordance with the invention should be electrically insulating, that is to say should not have any electrical conductivity. Electrically insulating or no electrical conductivity means that these properties can be present to a limited extent, but do not increase the values for the uncoated film.

The application quantity of end-consolidated binder selected from the group of binders based on polyvinylene dichloride (PVDC), polyacrylates, polymethacrylates, polyethylene imines, polyesters, polyamides, polyimides, polyurethanes, polycarbonates, silicate binders, grafted polyolefins, polymers from the class of halogenated polymers, for example PTFE, and mixtures thereof is preferably 0.05 $g/m^2$ to 10 $g/m^2$, in particular 0.1 $g/m^2$ to $g/m^2$, [only binder, dried]. Preferred ranges for binders based on polyvinylene dichloride (PVDC) are 0.05 $g/m^2$ to 10 $g/m^2$, preferably 0.1 $g/m^2$ to 5 $g/m^2$, [only binder, dried].

In the case of the use of a binder, the inorganic, preferably ceramic coating according to the invention, in relation to binder and inorganic, preferably ceramic particles in the dried state, comprises 98% by weight to 50% by weight of inorganic, preferably ceramic particles and 2% by weight to 50% by weight of binder selected from the group of binders based on polyvinylene dichloride (PVDC), polyacrylates, polymethacrylates, polyethylene imines, polyesters, polyamides, polyimides, polyurethanes, polycarbonates, silicate binders, grafted polyolefins, polymers from the class of halogenated polymers, for example PTFE, and mixtures thereof, wherein, among the binders, end-consolidated binders based on polyvinylene dichloride (PVDC) are preferred. Furthermore, the inorganic, preferably ceramic coating according to the invention may also contain additives to a limited extent, which are necessary for the handling of the dispersion.

The inorganic, preferably ceramic coating according to the invention is applied by means of known coating techniques, for example by doctoring or spraying or printing, as powder or as dispersion, onto the porous BOPP film.

In a variant, the inorganic, preferably ceramic coating is applied as a dispersion. These dispersions, besides the inorganic, preferably ceramic particles according to the invention, comprise at least one of the aforementioned binders, preferably binders based on polyvinylene dichloride (PVDC), and/or water and/or optionally organic substances, which improve the dispersion stability or increase the wettability of the porous BOPP film. The inorganic substances are volatile organic substances, such as monovalent or polyvalent alcohols, in particular those of which the boiling point does not exceed 140° C. Due to availability, isopropanol, propanol and ethanol are particularly preferred.

The application of the inorganic, preferably ceramic particles is described in detail in DE-A-10208277, for example.

Preferred dispersions comprise:
(i) 20% by weight to 90% by weight, particularly preferably 30% by weight to 80% by weight, of inorganic, preferably ceramic particles,
(ii) 1% by weight to 30% by weight, particularly preferably 1.5% by weight to 20% by weight, of binders selected from the group of binders based on polyvinylene dichloride (PVDC), polyacrylates, polymethacrylates, polyethylene imines, polyesters, polyamides, polyimides, polyurethanes, polycarbonates, silicate binders, grafted polyolefins, polymers from the class of halogenated polymers, for example PTFE, and mixtures thereof, wherein, among the binders, end-consolidated binders based on polyvinylene dichloride (PVDC) are preferred,
(iii) optionally 0.01 to 3.0% by weight, particularly preferably 0.01% by weight to 0.5% by weight, of organic substances, which improve the dispersion stability or increase the wettability of the porous BOPP film, in particular monovalent or polyvalent alcohols,
(iv) optionally 0.00001% by weight to 10% by weight, particularly preferably 0.001% by weight to 5% by weight, of further additives, such as dispersion stabilisers and/or antifoaming agents,
(v) water, such that the sum of all components amounts to 100% by weight.

In a further embodiment, a dry coating of the porous film may be performed. Here, the above-described particles are applied to the surface of the porous film directly using suitable tools, for example a doctor blade, a roll or the like. In this case, the applied lamination coating consists only of the particles. In accordance with this method, particles with a particle size of less than 5 μm, preferably 0.001 to 2 μm, can preferably be applied, in particular the silicate-based particles or TiO2 particles.

The present invention also relates to a method for producing the inorganic, preferably ceramic coated porous BOPP film according to the invention. In accordance with this method, the porous film is produced by the flat film extrusion or flat film coextrusion method, which are known per se. Within the scope of this method, an approach is adopted such that the mixture of propylene homopolymer and/or propylene block copolymer and β-nucleation agent and optionally further polymers (for example the material having the shut down function) is mixed with the respective layer, melted in an extruder and, optionally jointly and simultaneously, extruded or coextruded through a flat film die onto a take-off roll, on which the single-layer or multi-layer melt film solidifies and cools, thus forming the β-crystallites. The cooling temperatures and cooling times are selected such that a maximum proportion of β-crystalline polypropylene is produced in the preliminary film. Generally, this temperature of the take-off roll or of the take-off rolls is 60 to 140° C., preferably 80 to 130° C. The dwell time at this temperature may vary and should be at least 20 to 300 s, preferably 30 to 100 s. The preliminary film thus obtained generally contains a proportion of β-crystallites of 40-95%, preferably 50-85%.

This preliminary film with a high proportion of β-crystalline polypropylene is then biaxially drawn in such a way that, during the drawing, the β-crystallites are converted into α-crystalline polypropylene and a network-like porous structure is formed. The biaxial drawing (orientation) is generally performed successively, wherein drawing is preferably first performed longitudinally (in machine direction) and then transversely (perpendicularly to the machine direction).

For the drawing in longitudinal direction, the cooled preliminary film is first guided over one or more heating rolls, which heat the film to the suitable temperature. This temperature is generally less than 140° C., preferably 70 to 120° C. The longitudinal drawing is then performed generally with the aid of two rolls running at different speeds in accordance with the sought draw ratio. The longitudinal draw ratio lies here in a range from 2:1 to 6:1, preferably 3:1 to 5:1. In order to avoid an excessively high orientation in the longitudinal direction, the width shrinkage with longitudinal drawing is kept low, for example by providing a comparatively narrow drawing gap. The length of the drawing gap is generally 3 to 100 mm, preferably 5 to 50 mm. Fixing elements, such as width holders, may also optionally contribute to a low width shrinkage. The shrinkage should be less than 10%, preferably 0.5-8%, in particular 1-5%.

Following this longitudinal drawing, the film is first cooled again via rolls that are temperature-controlled accordingly. Heating is then performed again in what are known as the heating fields to a transverse drawing temperature, which generally lies at a temperature of 120-145° C. The transverse drawing is then performed with the aid of a corresponding clip frame, wherein the transverse drawing ratio lies in a range from 2:1 to 9:1, preferably 3:1-8:1. In order to attain the high porosities, the transverse drawing is performed with a moderate to slow transverse drawing speed of >0 to 40%/s, preferably in a range from 0.5 to 30%/s, in particular 1 to 15%/s.

Optionally, after the last drawing, generally the transverse drawing, a surface of the film can be corona-, plasma- or flame-treated in accordance with one of the known methods, such that the filling with electrolyte is promoted. The surface is preferably the surface of the film that is not coated subsequently.

A thermofixing (heat treatment) is then optionally performed, in which the film is held for approximately 5 to 500 s, for example 10 to 300 s, at a temperature of 110 to 150° C., preferably at 125 to 145° C., for example via rolls or an air heater box. The film is optionally conveyed in a converging manner immediately before or during the thermofixing, wherein the convergence is preferably 5-25%, in particular 8 to 20%. The term convergence is understood to mean a slight bringing together of the transverse drawing frame, such that the maximum width of the frame that is given at the end of the transverse drawing process is greater than the width at the end of the thermofixing. Of course, the same is true for the width of the film web. The degree to which the transverse drawing frame is brought together is specified as convergence, which is calculated from the maximum width of the transverse drawing frame $B_{max}$ and the end film width $B_{film}$ in accordance with the following formula:

$$\text{Convergence }[\%] = 100 \times (B_{max} - B_{film})/B_{max}$$

The film is then rolled up in the usual manner using a winding device.

In known sequential methods, in which longitudinal and transverse drawing are performed successively in one method, it is not only the transverse drawing speed that is dependent on the process speed. The take-off speed and the cooling rate also vary with the process speed. These parameters therefore cannot be selected independently of one another. It follows that, under otherwise identical conditions, in the case of a slower process speed, not only is the transverse drawing speed reduced, but also the cooling and take-off speed of the preliminary film. This may constitute an additional problem, although this is not necessarily the case.

In a further embodiment of the method according to the invention, it is therefore advantageous to divide the method for producing the sequentially drawn film into two separate methods, that is to say into a first method, which includes all methods steps up to and including cooling following longitudinal drawing, referred to hereinafter as the longitudinal drawing method, and into a second method, which includes all method steps following the longitudinal drawing method, referred to hereinafter as the transverse drawing method. This embodiment of the method according to the invention as a two-stage method makes it possible to select the process speed of the first method and therefore the respective conditions, in particular cooling and take-off speeds, and also the longitudinal drawing conditions independently of the transverse drawing speed. Accordingly, the transverse drawing speed can be slowed arbitrarily in the second transverse drawing method, for example by reducing the process speed or by lengthening the drawing frame, without negatively influencing formation of the β-crystallites or the longitudinal drawing conditions. This method variant is implemented by performing the longitudinal drawing method as described above and by rolling up this film for the first time following the cooling of the longitudinally drawn film. This longitudinally drawn film is then used in the second transverse drawing method, that is to say in this second method all method steps following cooling of the longitudinally drawn film are performed as described above. Here, the optimum transverse drawing speed can now be selected independently.

The above-mentioned process speeds of the longitudinal drawing method or of the transverse drawing method or of the sequential method is to be understood in each case to mean the speed, for example in m/min, at which the film is conveyed during the respective subsequent winding process. Depending on the conditions, both a quicker and a slower process speed compared with that during the longitudinal drawing method may be advantageous during the transverse drawing method.

The method conditions during the method according to the invention for producing the porous films differ from the method conditions that are usually observed with the production of a biaxially oriented film. In order to attain a high porosity and permeability, both the cooling conditions during the solidification of the preliminary film and the temperatures and the factors during the drawing are critical. Firstly, a high proportion of β-crystallites in the preliminary film has to be attained by correspondingly slow and moderate cooling, that is to say at comparatively high temperatures. During the subsequent longitudinal drawing, the β-crystals are converted into the alpha modification, whereby imperfections are produced in the form of microcracks. So that these imperfections are produced in sufficient number and in the correct form, the longitudinal drawing has to be performed at comparatively low temperatures. During the transverse drawing, these imperfections are torn open to form pores, such that the characteristic network structure of these porous films is produced.

These temperatures, which are low compared with conventional boPP processes, in particular during the longitudinal drawing, require hire drawing forces, which on the one hand introduce a high orientation into the polymer matrix and on the other hand increase the risk of tearing. The higher the desired porosity, the lower must the temperatures during the drawing be selected and the higher must be the drawing factors. The process is therefore in principle more critical, the higher are to be the porosity and permeability of the film. The porosity therefore cannot be increased arbitrarily via higher drawing factors or a lowering of the drawing temperature. In particular, the lowered longitudinal drawing temperature leads to a heavily impaired conveying reliability of the film and to an unwanted increase of the tendency for splitting. The porosity therefore can no longer be improved further by lower longitudinal drawing temperatures for example below 70° C.

Further, it is possible to additionally influence the porosity and permeability of the film via the drawing speed during the transverse drawing. A slow transverse drawing increases the porosity and permeability further, without leading to increased tearing or other disruptions during the production process. The film has a special combination of high porosity and permeability, mechanical strength, good conveying reliability during the production process and low tendency for splitting in the longitudinal direction.

Hereinafter, the inorganic, preferably ceramic coating is applied by means of known technologies, for example by doctoring or spraying or printing, in the form of a dispersion or as a powder, preferably an aqueous dispersion, to the porous BOPP film produced as above. The application can also be performed by means of rolling, such that the area to be coat can be set by the surface pattern of the rolls.

The porous film (BOPP film) to be coated preferably has a defined roughness Rz (DIN 4768, cut-off 2.5 mm) from 0.02 μm to 6 μm, preferably 0.3 to 6 μm.

The porous film (BOPP film) to be coated preferably has a β-activity from 35% to 99%.

Provided the porous film (BOPP film) to be coated has a low roughness Rz from 0.02 to 1 μm, the partial coating can be produced by different methods. One possible method is the use of masks or stencils, which cover the film in part or allow the application only in part. A further possibility for producing the partial coating according to the invention consists of corresponding printing techniques, for example inkjet printing or by use of rolls having a defined surface pattern (indentation), by means of which the partial areas are applied. Preferred surface patterns are defined geometric shapes, such as regular shapes with n edges, in particular those in which n is an integer from 3 to 8, circles or ovals. The depth of the pattern is determined by the desired thickness of the ceramic coating.

Provided the porous film (BOPP film) to be coated has a roughness Rz from 0.02 to 6 μm, in particular from 0.3 to 6 μm, preferably >1 to 6 μm, the applied inorganic, preferably ceramic coating collects in the depressions of the surface and smooths these. The provided surface tension of the dispersions can be selected such that the dispersion with which the inorganic, preferably ceramic coating is applied protrudes from these depressions and thus produces the coating according to the invention.

The partial inorganic, preferably ceramic coating is preferably applied directly to the porous BOPP film produced as above, such that there is no need for any prior treatment of the film with adhesion promoters, nor is there any need for the use of adhesion promoters in the inorganic, preferably ceramic coating compound used for the coating.

In addition, it has been found that, in particular in the case of porous BOPP films, there is no need for any post-treatment of the surface of the film, in particular the side of the film that is to be coated subsequently, by means of one of the known methods, such as corona, plasma or flame treatment, and the inorganic, preferably ceramic coating can be applied directly to the untreated porous BOPP film. In a further embodiment, the partial coating can also be applied following a treatment of the surface by means of corona, flame or plasma.

The application quantity of dispersion is preferably between 0.5 g/m² and 20 g/m². If the particles are applied as a dispersion, the freshly coated porous BOPP film is dried by means of commercially available driers, wherein the optionally present binder cures. The drying is usually performed at temperatures between 50° C. and 140° C. Here, the drying times are between 30 seconds and 60 minutes.

By means of the present invention, a film can be provided that, due to the high permeability, is suitable for the use in high-energy batteries and simultaneously meets the requirements of mechanical strengths, in particular a low tendency for splitting, and also the thermal stability required in this application.

The film may also be used advantageously in other applications, in which a very high permeability is required or is advantageous. These applications include, for example, applications in the form of a high-porous separator in batteries, in particular in lithium batteries with high power demand.

The partially inorganic, preferably ceramic coated separator film according to the invention based on porous polyolefin film comprises a porous biaxially oriented film formed from polypropylene with a porosity from 30 to 80% and a permeability of <1,000 s (Gurley value), and the permeability of the separator films according to the invention with partially inorganic, preferably ceramic coating is <1,200 s (Gurley value).

In accordance with the invention, the Gurley value of the porous film is only slightly increased by the partial coating. Generally, the Gurley value increases after the partial coating by less than 1,000 Gurley seconds, preferably by 1 to 600 Gurley seconds, in particular by 3 to 400 Gurley seconds, such that the permeability of the film is substantially maintained. More specifically, the application quantity and the degree of coatings are controlled such that the partial coated increases the Gurley value only by the above-mentioned values. In particularly advantageous embodiments, the Gurley value can remain almost constant, that is to say it increases only by >0 to 200 Gurley seconds.

Provided the partially inorganic, preferably ceramic coated separator film according to the invention based on porous polyolefin films additionally has a shut down function, this film demonstrates a Gurley value of >6,000 s when, or once, the coated separator film is heated for 5 minutes above 140° C.

The material forming the shut down function, in particular the polyethylene, is provided in the porous BOPP film used in accordance with the invention preferably in quantities of at least 5% by weight in relation to the provided propylene polymers and/or propylene block copolymers, particular preferably in quantities of at least 10% by weight.

FIG. 1 shows a microscopic image of the partially coated separator film according to the invention based on porous polyolefin films.

Figure 2:
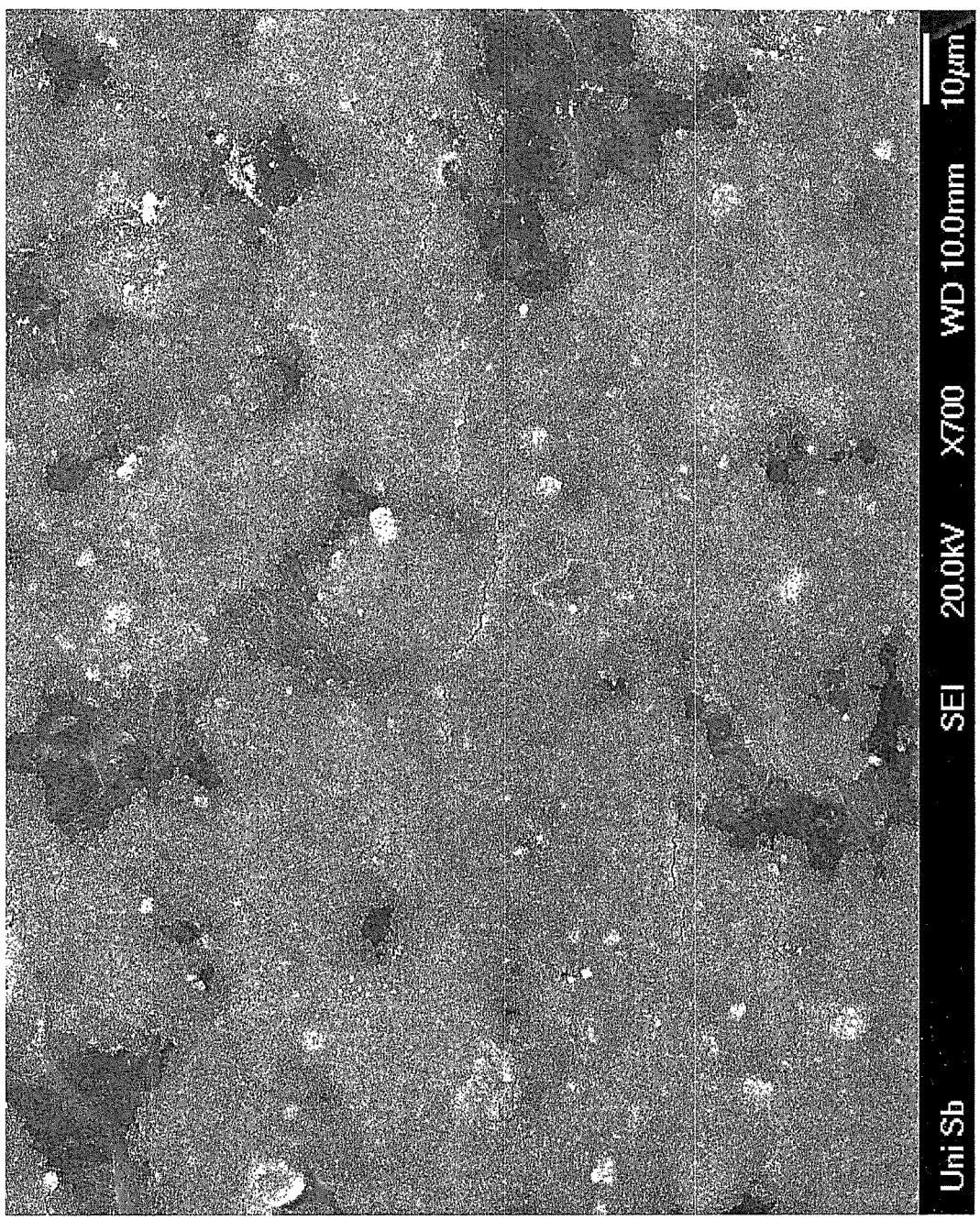
FIG. 2 shows a printout of a microscopic of the partially laminated separator film according to the invention.

FIG. 2 shows a printout of a microscopic image of the partially coated separator film according to the invention based on porous polyolefin films following sputtering with Pt on photo paper for determining the degree of coating. The dark areas represent the uncoated areas, whereas the light areas represent the coated areas.

The inorganic, preferably ceramic coating provided on the separator film according to the invention demonstrates good adhesive behaviour, wherein this is attained without use of adhesion promoters.

Surprisingly, the good adhesion between film and coating is also achieved without a corona, flame or plasma treatment, wherein the adhesion can be further improved in principle by these measures.

The particles also surprisingly adhere sufficiently to the porous film when the application is not performed from a dispersion, but the particles are applied directly. In this dry method too, the treatment of the surface by means of corona flame or plasma is not necessary, but is possible.

In order to characterise the raw materials and the films, the following measurement methods were used:

Particle Size Definition and Determination:

The average particle diameter or the mean particle size (=d50 or d90) was determined by a laser light scattering method in accordance with ISO 13320-1. A suitable measuring apparatus for particle size analysis is constituted for example by a Microtrac S 3500.

Degree of Coating:

A sample 5×5 mm was cut out of a coated film and sputtered with Pt (4 nm layer thickness) in vacuum and was then examined under scanning electron microscope (JEOL JSM-7000F). An area of 200×200 μm was imaged using an enlargement of 550 times.

Acceleration voltage was 20 kV (secondary electron image)

With this enlargement, the areas of the film coated with particles and the uncoated areas of the films can be easily seen. The recorded images are printed out on photo paper and coated and uncoated areas were cut out using scissors, separated from one another and weighed. The dark areas constitute the uncoated areas, whereas the light areas constitute the coated areas (see FIG. 2).

The degree of coating BG in percentage was then calculated from the ascertained weights as follows:

$$BG[\%]=100 \times M_B/(M_U+M_B)$$

Where $M_B$ indicates the mass of the photo paper showing the coated areas and $M_U$ is the mass of the photo paper with the areas without coating.

Melt Flow Index

The melt flow index of the propylene polymers was measured in accordance with DIN 53 735 and 2.16 kg load and 230° C.

Melting Point

In the context of the present invention, the melting point is the maximum of the DSC curve. In order to determine the melting point, a DSC curve with a heating and cooling rate of 10 K/1 min in the range from 20 to 200° C. was recorded. In order to determine the melting point, the second heating curve was evaluated once cooled at 10 K/1 min in the range from 200 to 20° C., as is usual.

β-Content and β-Activity

The proportion of the β-crystalline polypropylene was determined by means of DSC. This characterisation is described in J. o. Appl. Polymer Science, Vol. 74, p.: 2357-2368, 1999 by Varga and is performed as follows: the sample doped with β-nucleator is first heated in the DSC at a heating rate of 20° C./min to 220° C. and is melted (1$^{st}$ heating). Next, it is cooled at a cooling rate of 10° C./min to 100° C., before it is heated again at a heating rate of 10° C./min (2$^{nd}$ heating).

From the DSC curve of the first heating, the degree of crystallinity $K_{\beta,DSC}$ (proportion of β-crystalline polypropylene) that is present in the measured sample (undrawn film, injection moulded part) is determined from the ratio of the enthalpies of fusion of the β-crystalline phase ($H_\beta$) to the sum of the enthalpies of fusion of β- and α-crystalline phase ($H_\beta+H_\alpha$). The percentage value is calculated as follows:

$$K_{\beta,DSC} [\%]=100\times(H_\beta)/(H_\beta+H_\alpha)$$

This value corresponds to the β-content of the sample, for example a film or a raw material pattern.

From the DSC curve of the second heating, the degree of crystallinity $K_{\beta,DSC}$ (2$^{nd}$ heating) that is specified by the β-proportion of the respective polypropylene sample that can be achieved at most is determined from the ratio of the enthalpies of fusion of the β-crystalline phase ($H_\beta$) to the sum of the enthalpies of fusion of β- and α-crystalline phase ($H_\beta+H_\alpha$). This value corresponds to the β-activity of the sample.

Density

The density is determined in accordance with DIN 53 479, method A.

Bubble Point:

The bubble point was measured in accordance with ASTM F316.

Porosity

The density reduction ($\rho_{film}-\rho_{pp}$) of the film compared with the density of the pure polypropylene $\rho_{pp}$ is calculated as porosity as follows:

$$\text{porosity }[\%]=100\times(\rho_{pp}-\rho_{film})/\rho_{pp}$$

Permeability/Penetrability (Gurley Value)

The permeability of the films was measured using the Gurley Tester 4110 in accordance with ASTM 726-58. Here, the time (in sec) required by 100 cm$^3$ of air to permeate through the film surface of 1 inch$^2$ (6.452 cm$^2$) was determined. The pressure difference over the film corresponds here to the pressure of a water column of 12.4 cm height. The required time then corresponds to the Gurley value.

Roughness:

The roughness was determined as Rz and Rmax value in accordance with DIN 4768 using a confocal laser microscope (Leica DCM 3D) at a cut-off of 2.5 mm. An area of 500 μm×500 μm was evaluated for this purpose.

Shrinkage:

The shrinkage specifies the change in width of the film during the longitudinal drawing. Here, $B_0$ denotes the width of the film prior to longitudinal drawing and $B_1$ corresponds to the width of the film after longitudinal drawing. The longitudinal direction is the machine direction, and the transverse direction is defined accordingly as the direction transverse to the machine direction. The difference of the ascertained widths compared with the original width $B_0$ times 100 is then specified as shrinkage in percentage.

$$\text{shrinkage } B \, [\%]=[(B_0-B_1)/B_0]*100[\%]$$

Adhesive Behaviour:

A coated film piece measuring 6×6 cm was cut out using a template. This piece was placed with 3 cm overlap on a stainless steel cube with edge radius: 0.5 mm of size 8×8×8 cm with 3 cm overlap. The protruding 3 cm were then bent at right angles over the cube edge. With poor adhesion of the coating, the coating flakes from the edge and can be rubbed off using the fingers.

With good adhesion, there is at most a crack at the bend edge, however the adhesion on the film remains intact.

The invention will now be explained by the following examples.

EXAMPLES

Spherical silicate and TiO2 particles were examined for the inorganic, preferable ceramic coating.

Film Example 1:

Calcium pimelate as nucleation agent was mixed in a mixer at a concentration of 0.04% by weight with granulate formed from isotactic polypropylene homopolymer (melting point 162° C.; MFI 3 g/10 min) and a propylene block copolymer and was melted in a twin-screw extruder (housing temperature of 240° C. and 200 l/min$^{-1}$). After the extrusion method, the melt was extruded from a flat film die at an extrusion temperature of 245° C. to form a single-layer film. This film had the following composition:

approximately 50% by weight propylene homopolymer (PP) with an n-heptane-soluble proportion of 4.5% by weight (based on 100% PP) and a melting point of 165° C.; and a melt flow index of 3.2 g/10 min at 230° C. and 2.16 kg load (DIN 53 735), and approximately 49.96% by weight propylene ethylene block copolymer with an ethylene proportion of approximately 5% by weight based on the block copolymer and a melt flow index (230° C. and 2.16 kg) of 6 g/10 min, 0.04% by weight nano Ca pimelate as β-nucleation agent.

The film additionally contained stabiliser and neutralisation agent in conventional quantities.

The polymer mixture was drawn after extrusion over a first take-off roll and a further roll trio, cooled and solidified, then longitudinally drawn, transversely drawn and fixed, wherein the following conditions were selected in particular:

extrusion: extrusion temperature 245° C.

chilling roll: temperature 125° C., take-off speed: 1.5 m/min (dwell time on the take-off roll: 55 sec)

β-content of the preliminary film: 72% longitudinal extension: drawing roll T=90° C.

longitudinal drawing by the factor of 4 transverse drawing: heating field T=145° C.

drawing field T=145° C.

transverse drawing by the factor of 4

The porous film thus produced was thus approximately 20 μm thick and had a density of 0.30 g/cm$^3$ and had a uniform white-opaque appearance. The porosity was 665% and the Gurley value 180 s. Roughness Rz of the surface to be coated: 1.88 μm.

Film Example 2:

Following the extrusion process, a single-layer preliminary film was extruded from a flat film die at an extrusion temperature from 240 to 250° C. This preliminary film was first removed on a chilling roll and cooled. The preliminary film was then oriented in the longitudinal and transverse direction and subsequently fixed. The film had the following composition:

Approximately 60% by weight of highly isotactic propylene homopolymer (PP) with a $^{13}$C-NMR isotacticity of % and an n-heptane-soluble proportion of 2.5% by weight (based on 100% PP) and a melting point of 165° C.; and a melt flow index of 2.5 g/10 min at 230° C. and 2.16 kg load (DIN 53 735)

and approximately 20% by weight of HDPE (high density polyethylene) with a density of 0.954 (ISO 1183) and an MFI of 0.4 g/10 min at 190° C. and 2.16 kg load (ISO 1133/D) or 27 g/10 min at 190° C. and 21.6 kg load (ISO 1333/G) and melting point of 130° C. (DSC: peak at 10° C./min heating rate), the melting range starts at 125° C.

approximately 20% by weight propylene ethylene block copolymer with an ethylene proportion of 5% by weight in relation to the block copolymer and an MFI (230° C. and 2.16 kg) of 6 g/10 min and a melting point (DSC of 165° C. was used, and 0.04% by weight Ca pimelate as β-nucleation agent.

The film additionally contained stabiliser and neutralisation agent in the low conventional quantities.

The molten polymer mixture was drawn following extrusion over a first take-off roll and a further roll trio and was solidified, then longitudinally drawn, transverse drawn and fixed, wherein, more specifically, the following conditions were selected:
extrusion: extrusion temperature 235° C.
take-off roll: temperature 125° C.,
take-off speed: 4 m/min
β-content of the preliminary film: 66% longitudinal drawing: drawing roll T 90° C.
longitudinal drawing by the factor of 3.0
transverse drawing: heating field T=125° C.
drawing field T=125° C.
transverse drawing by the factor of 5.0
fixing: T=125° C.

The porous film thus produced was approximately 25 μm thick and had a density of 0.38 g/cm$^3$ and had a uniform white-opaque appearance. Roughness Rz: 2.05 μm of the surface to be coated.

TABLE 1

Composition of inorganic Coatings

| | Particles | Particle size (REM recording) | Particle % by weight | Water % | Isopropanol % | PVDC binder |
|---|---|---|---|---|---|---|
| Coat. 1 | TiO2 | 100-300 nm | 100 | — | — | — |
| Coat. 2 | spherical silicate (SiO2) | 1-10 μm | 100 | — | — | — |
| Coat. 3 | TiO2 | 100-300 nm | 20 | — | 80 | — |
| Coat. 4 | spherical silicate (SiO2) | 1-10 μm | 58 | 17 | 8 | 17 |
| Coat. 5 | TiO2 | 100-300 nm | 47 | 23 | 12 | 18 |

Example 1

Powdery TiO2 pigment (Table 1, Coating 1) was applied using a rubber doctor blade to a microporous BOPP film (film example 1). The coating demonstrated good adhesion on the film. The application weight of the coating was then determined by weighing, and the air permeability was determined on the basis of the Gurley value. The REM recordings show the partial areas on the film filled with the particles. Only a small rise of the Gurley value was observed.

Example 2

Powdery TiO2 pigment (Table 1, Coating 1) was applied using a rubber doctor blade to a microporous BOPP film (film example 2). The coating demonstrated good adhesion on the film. The application weight of the coating was then determined by weighing, and the air permeability was determined on the basis of the Gurley value. The REM recordings show the partial areas on the film filled with the particles. Only a small rise of the Gurley value was observed.

Example 3

A dispersion of TiO2 in isopropanol (Table 1, Coating 3) was applied to a microporous BOPP film (film example 1) using a wire rod (wire diameter: 0.3 mm). Once dried for 30 min for 90° C. in a drying cupboard, the application weight of the coating was determined by weighing, and the air permeability was determined on the basis of the Gurley value. Only a small rise of the Gurley value was observed. REM recordings show the partial areas on the film filled with the particles.

Example 4

A dispersion of TiO2 in isopropanol (Table 1, Coating 3) was applied to a microporous BOPP film (film example 2) using a wire rod (wire diameter: 0.3 mm). Once dried for 30 min for 90° C. in a drying cupboard, the application weight of the coating was determined by weighing, and the air permeability was determined on the basis of the Gurley value. Only a small rise of the Gurley value was observed. REM recordings show the partial areas on the film filled with the particles.

Example 5

A dispersion of SiO2 and PVDC binder in water and isopropanol (Table 1, Coating 4) was applied to a microporous BOPP film (film example 1) using a wire rod (wire diameter: 0.3 mm). Once dried for 30 min for 90° C. in a drying cupboard, the application weight of the coating was determined by weighing, and the air permeability was determined on the basis of the Gurley value. Only a slight rise of the Gurley value was observed. REM recordings show the partial areas on the film filled with the particles.

Example 6

A dispersion of TiO2 and PVDC binder in water and isopropanol (Table 1, Coating 5) was applied to a microporous BOPP film (film example 1) using a wire rod (wire diameter: 0.3 mm). Once dried for 30 min for 90° C. in a drying cupboard, the application weight of the coating was determined by weighing, and the air permeability was determined on the basis of the Gurley value. Only a slight rise of the Gurley value was observed. REM recordings show the partial areas on the film filled with the particles.

Example 7 (Comparison)

Powdery TiO2 pigment (Table 1, Coating 1) was applied to a commercially obtainable microporous separator from the company Celgard (C200). The adhesion was tested using the above-described adhesion test. The powder demonstrated no adhesion to the film.

Example 8 (Comparison)

A dispersion of TiO2 in isopropanol (Table 1, Coating 3) was applied to the separator from the company Celgard (C200) using a wire rod (wire diameter: 0.3 mm). This was then dried for 30 min at 90° C. in a drying cupboard. The adhesion was tested using the above-described adhesion test. The powder did not demonstrate any adhesion and falls off.

Example 9 (Comparison)

Powdery TiO2 pigment (Table 1, Coating 1) was applied to another commercially obtainable polyolefin separator from the company UBE using a rubber doctor blade. The adhesion was tested using the above-described adhesion test. The powder does not demonstrate any adhesion to the film.

Example 10 (Comparison)

A dispersion of TiO2 in isopropanol (Table 1, Coating 3) was applied to the polyolefin separator from the company UBE using a wire rod (wire diameter: 0.3 mm). This was then dried for 30 min at 90° C. in a drying cupboard. The adhesion was tested using the above-described adhesion test. The powder demonstrated no adhesion and falls off.

TABLE 2

| | Separator/film type | Coating formulation | Gurley prior to coating | Gurley after coating | Application weight/g/m² | Adhesion* | % coating |
|---|---|---|---|---|---|---|---|
| Ex. 1 | film example 1 | Coat. 1 | 230 | 240 | 2.9 | yes | 55 |
| Ex. 2 | film example 2 | Coat. 1 | 220 | 230 | 2.1 | yes | 40 |
| Ex. 3 | film example 1 | Coat. 3 | 230 | 260 | 5.2 | yes | 70 |
| Ex. 4 | film example 2 | Coat. 1 | 220 | 310 | 3.8 | yes | 50 |
| Ex. 5 | film example 1 | Coat. 4 | 230 | 250 | 4.2 | yes | 85 |
| Ex. 6 | film example 1 | Coat. 5 | 230 | 245 | 3.8 | yes | 80 |
| Ex. 7 (c) | Celgard C 200 | Coat. 1 | 620 | 620 | 0 | none | 4 |
| Ex. 8 (c) | Celgard C 200 | Coat. 3 | 620 | 620 | 0 | none | 3 |
| Ex. 9 (c) | UBE 3014 | Coat. 1 | 540 | 540 | 0 | none | 4 |
| Ex. 10 (c) | UBE 3014 | Coat. 3 | 540 | 540 | 0 | none | 4 |

*The adhesion was determined by means of the above-described "adhesion behaviour" test.

The invention claimed is:

1. A biaxially orientated single or multilayer porous film, which comprises at least one porous layer, and this layer contains at least one propylene polymer, and a β-nucleation agent wherein
   (i) the porosity of the porous film is 30% to 80%, and
   (ii) the permeability of the porous film is <1,000 s (Gurley value),
   (iii) the porous film has a partial inorganic coating wherein the partial coating is at least 20% up to 95% of the entire surface of a side of the film is coated and
   (iv) the coated porous film has a Gurley value of <1,200 s and
   wherein the inorganic coating is applied as a powder or dispersion directly to the porous film by doctoring or spraying or printing.

2. The film according to claim 1, wherein the porosity is produced by converting β-crystalline polypropylene when drawing the film.

3. The film according to claim 1, wherein the porous film has a β-activity from 35% to 99%.

4. The film according to claim 1, wherein the propylene polymer is a propylene homopolymer and/or a propylene block copolymer.

5. The film according to claim 2, wherein the β-nucleation agent comprises γ-quinacridone, dihydroquinacridine, dicarboxamide or a calcium salt of dicarboxylic acids, and/or a nanoscale iron oxide.

6. The film according to claim 1, wherein the film comprises 50 to 85% by weight of propylene homopolymer and/or propylene block copolymer, and 15 to 50% by weight of propylene block copolymers, and contains 50 to 10,000 ppm β-nucleation agent.

7. The film according to claim 6, wherein the film contains further polyolefins in a quantity <10% by weight and the proportion of the propylene homopolymer and/or of the propylene block copolymer is reduced accordingly.

8. The film according to claim 1, wherein the film additionally has a shut down function and the coated film has a Gurley value of >6,000 s, after the film has been heated for 5 minutes above 140° C.

9. The film according to claim 8, wherein the at least one porous layer contains a material which provides the porous films with a shut down function.

10. The film according to claim 9, wherein the film comprises 50 to 85% by weight of propylene homopolymer and/or propylene block copolymer (propylene polymers), and 15 to 50% by weight of propylene block copolymers, and contains 50 to 10,000 ppm β-nucleation agent and the material comprises a polyethylene, wherein the material forming the shut down function is provided in quantities of at least 5% by weight in relation to the propylene polymers and/or propylene block copolymers.

11. The film according to claim 1, wherein the density of the film lies in a range of 0.1 g/cm³ to 0.6 g/cm³.

12. The film according to claim 1, wherein the film has a thickness from 10 μm to 100 μm.

13. The film according to claim 1, wherein the at least one propylene polymer has not been produced by use of metallocene catalysts.

14. The film according to claim 1, wherein the inorganic coating comprises inorganic particles, of which the particle size, expressed as D50 value, lies in the range between 0.005 μm and 10 μm.

15. The film according to claim 14, wherein the inorganic particles are ceramic particles which comprises an electrically non-conductive oxide of the metals Al, Zr, Si, Sn, Ti and/or Y.

16. The film according to claim 14, wherein the inorganic particles comprise (i) particles based on oxides of silicon with the empirical formula $SiO_2$,
   (ii) mixed oxides with the empirical formula $AlNaSiO_2$, and
   (iii) oxides of titanium with the empirical formula $TiO_2$, wherein these can be present in crystalline, amorphous or mixed form.

17. The film according to claim 14, wherein the inorganic particles have a melting point of at least 160° C.

18. The film according to claim 1, wherein the inorganic coating has a thickness from 0.05 μm to 10 μm.

19. The film according to claim 1, wherein the inorganic coating also comprises at least one end-consolidated binder.

20. The film according to claim 1, wherein the inorganic coating comprises inorganic, particles, of which the compressive strength is at least 100 kPa.

21. A method for producing a coated film according to claim 1, comprising the following steps:
(i) extruding a single-layer or multilayer porous polypropylene film, in which a mixture of propylene polymer and β-nucleation agent is melted in an extruder and is extruded through a flat film die onto a take-off roll,
(ii) cooling the extruded melt film and then solidified so as to form β-crystallites,
(iii) drawing the film in the longitudinal direction and then in the transverse direction, wherein, in the case of the transverse drawing, the film is drawn at a slow drawing speed of less 40%/sec, and the film has a Gurley value of <1,000 s after production,
(iv) applying a dispersion directly to the porous film by doctoring or spraying or printing comprising
(a) 20% by weight to 90% by weight of inorganic particles,
(b) 1% by weight to 30% by weight, of binder selected from the group of binders based on polyvinylene dichloride (PVDC), polyacrylates, polymethacrylates, polyethylene imines, polyesters, polyamides, polyimides, polyurethanes, polycarbonates, silicate binders, grafted polyolefins, polymers from the class of halogenated polymers, and mixtures thereof,
(c) optionally 1% by weight to 30% by weight of organic substances which improve the dispersion stability or increase the wettability of the porous biaxially oriented polypropylene (BOPP) film,
(d) optionally 0.00001% by weight to 10% by weight, of further additives which is selected from the group consisting of stabilizers and neutralization agents,
(e) water to give a sum of all components of the dispersion of 100% by weight,
(v) drying the porous film coated with the dispersion,
wherein the porous film has a partial inorganic coating and the coated porous film has a Gurley value of <1,200 s.

22. The film according to claim 1, wherein the porous biaxially oriented polypropylene (BOPP) film is not subject to any post-treatment of the surface of the film by means of one of the methods constituted by corona, plasma or flame treatment.

23. The film according to claim 1, wherein the porous biaxially oriented polypropylene (BOPP) film is made comprising the following steps:
(i) extruding a single-layer or multilayer porous polypropylene film, in which a mixture of propylene polymer and β-nucleation agent is melted in an extruder and is extruded through a flat film die onto a take-off roll,
(ii) cooling the extruded melt film and then solidified so as to form β-crystallites,
(iii) drawing the film in the longitudinal direction and then in the transverse direction, wherein, in the case of the transverse drawing, the film is drawn at a slow drawing speed of less 40%/sec, and the film has a Gurley value of <1,000 s after production,
(iv) applying a dispersion directly to the porous film by doctoring or spraying or printing comprising
(a) 20% by weight to 90% by weight of inorganic particles,
(b) 1% by weight to 30% by weight, of binder selected from the group of binders based on polyvinylene dichloride (PVDC), polyacrylates, polymethacrylates, polyethylene imines, polyesters, polyamides, polyimides, polyurethanes, polycarbonates, silicate binders, grafted polyolefins, polymers from the class of halogenated polymers, and mixtures thereof,
(c) optionally 1% by weight to 30% by weight of organic substances which improve the dispersion stability or increase the wettability of the porous biaxially oriented polypropylene (BOPP) film,
(d) optionally 0.00001% by weight to 10% by weight, of further additives which is selected from the group consisting of stabilizers and neutralization agents,
(e) water to give a sum of all components of the dispersion of 100% by weight,
(v) drying the porous film coated with the dispersion,
wherein the porous film has a partial inorganic coating, and the coated porous film has a Gurley value of <1,200 s and
after step (iii) and prior to the application of the coating in step (iv) does not experience any further post treatment and is coated directly.

24. A separator which comprises the film according to claim 1.

25. A lithium, lithium-ion, lithium-polymer or alkaline earth battery which comprises the film according to claim 1.

26. The method according to claim 21, wherein the surface of the porous film is treated by means of corona, flame or plasma prior to coating and the coating is then performed on the treated surface.

27. The film according to claim 1, wherein the Gurley value increases after the coating by less 600 Gurley seconds.

28. The film as claimed in claim 1, wherein the porous film has a partial inorganic coating wherein the partial coating is at least 25% up to 90% of the entire surface of a side of the film is coated.

29. The film according to claim 1, wherein the partial coating is form 40% to 85% of the entire surface of a side of the film that is coated.

30. A method for producing
a biaxially orientated single or multilayer porous coated film, which comprises at least one porous layer, and this layer contains at least one propylene polymer, and a β-nucleation agent wherein
(i) the porosity of the porous film is 30% to 80%, and
(ii) the permeability of the porous film is <1,000 s (Gurley value),
(iii) the porous film has a partial inorganic coating wherein the partial coating is at least 20% up to 95% of the entire surface of a side of the film is coated and
(iv) the coated porous film has a Gurley value of <1,200 s and
which comprises partially coating an uncoated surface of a porous film with a powder formed from inorganic particles wherein the inorganic coating is applied as a powder or dispersion directly to the porous film by doctoring or spraying or printing.

31. The method according to claim 26, wherein the inorganic particles comprise
(i) particles based on oxides of silicon with the empirical formula $SiO_2$,
(ii) mixed oxides with the empirical formula $AlNaSiO_2$, and
(iii) oxides of titanium with the empirical formula $TiO_2$.

32. The method according to claim 30, wherein the surface of the porous film is not treated by means of corona, flame or plasma prior to coating.

33. A biaxially orientated single or multilayer porous film, which comprises at least one porous layer, and this layer contains at least one propylene polymer, and a β-nucleation agent wherein
- (i) the porosity of the porous film is 30% to 80%, and
- (ii) the permeability of the porous film is <1,000 s (Gurley value),
- (iii) the porous film has a partial inorganic coating wherein the partial coating is at least 20% up to 95% of the entire surface of a side of the film is coated and
- (iv) the coated porous film has a Gurley value of <1,200 s and wherein the inorganic coating is applied as a powder or dispersion directly to the porous film by doctoring or spraying or printing without a binder.

* * * * *